United States Patent [19]

Moryl

[11] 4,208,944
[45] Jun. 24, 1980

[54] FASTENING DEVICES

[75] Inventor: Richard Moryl, Maisons Laffitte, France

[73] Assignee: G.O.M.E.T. Compagnie de Materiel et d'Equipements Techniques, Senlis, France

[21] Appl. No.: 862,910

[22] Filed: Dec. 21, 1977

[30] Foreign Application Priority Data

Dec. 21, 1976 [FR] France .................... 76 38545

[51] Int. Cl.² ............................................. F16B 13/06
[52] U.S. Cl. ............................................. 85/71; 85/80
[58] Field of Search ................... 85/80, 81, 71, 82, 83, 85/70, 5 R; 151/41.75; 24/73 P, 73 PF

[56] References Cited

U.S. PATENT DOCUMENTS

| 2,255,650 | 9/1941  | Burke    | 85/83 |
| 2,956,605 | 10/1960 | Rapata   | 85/80 |
| 3,505,921 | 4/1970  | Wigam    | 85/71 |
| 3,830,134 | 8/1974  | Erickson | 85/80 |
| 3,869,958 | 3/1975  | Murayama | 85/80 |
| 3,888,156 | 6/1975  | Fima     | 85/71 |
| 4,077,300 | 3/1978  | Yoda     | 85/80 |

FOREIGN PATENT DOCUMENTS 2320566  4/1973  Fed. Rep. of Germany ............ 85/80

Primary Examiner—Ramon S. Britts
Assistant Examiner—Peter A. Aschenbrenner
Attorney, Agent, or Firm—Cushman, Darby & Cushman

[57] ABSTRACT

To fasten by screwing an object on to a metal plate 9 drilled with a noncircular hole 12, recourse is had to a clip made from a moulded plastic material comprising a socket 1 adapted to receive a screw and extended by a flange 5. In the wall of the socket there are provided two grooves 10 in the form of a U each surrounding a thickened portion 7, said portion being connected to the inner edge of the flange by a bridge 11 and nipping, during screwing of the screw into the socket, the edge of the metal plate by bending around this bridge.

8 Claims, 6 Drawing Figures

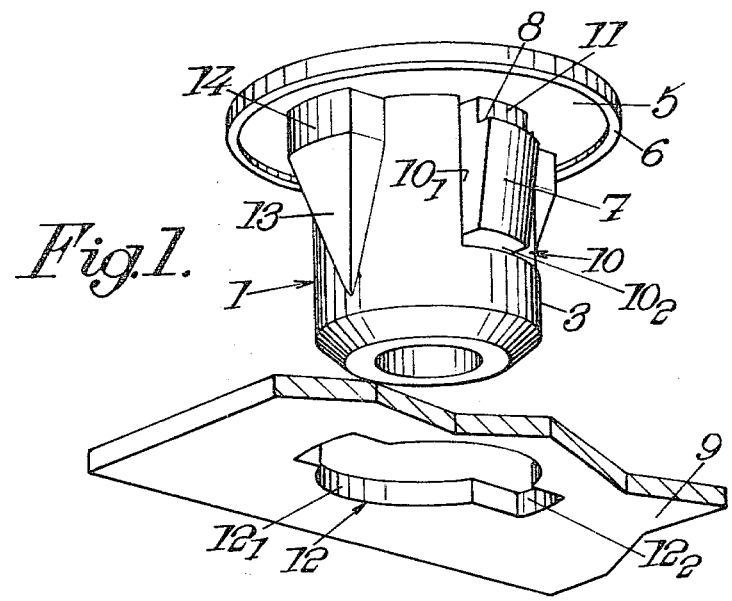
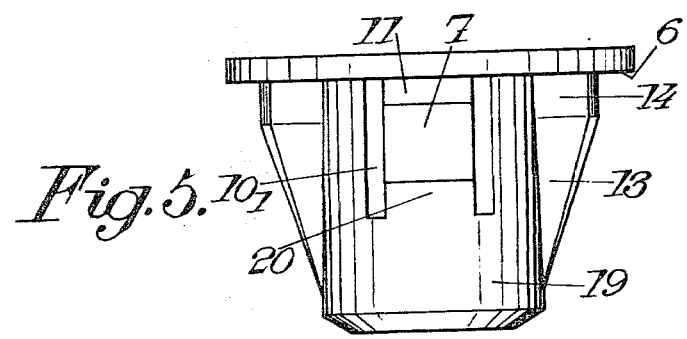
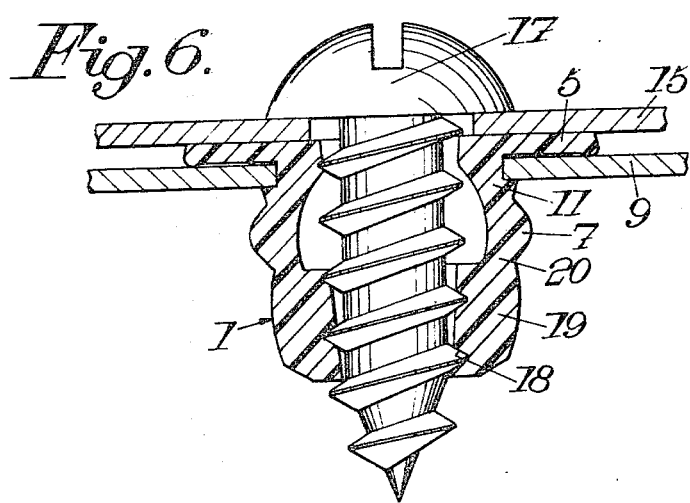

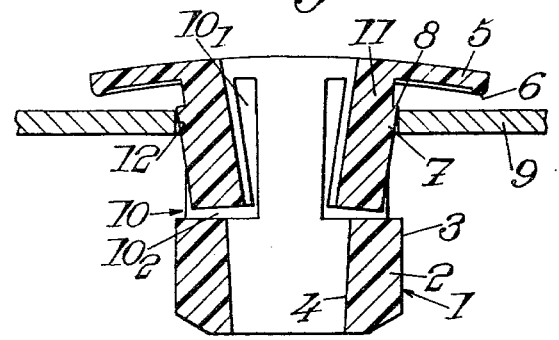

FASTENING DEVICES

The invention relates to devices for fastening an object by screwing on to a support, such as a metal plate, perforated with a hole, preferably non circular, the fastening in question being entirely carried out from the same side of said support, the opposite side of this support being possibly inaccessible, as is frequently the case with the coachwork of road, rail or other vehicles.

The invention concerns more particularly, among fastening devices of the kind in question, those formed by a screw and a one-piece clip made from a moulded material comprising a socket with a relatively thick wall adapted to penetrate jointingly into the hole of the support and to receive the screw so that it ploughs therein its furrow itself, said socket forming at one of its ends a continuous ring and being extended radially at its other end by a continuous transverse flange adapted to bear on the edge of said hole.

To lock the fixture of such a clip on the support for the axial introduction of its socket into the hole of the support, it has already been proposed to burst into the wall of this socket lugs whose free end, being radially thickened so as to form a boss or catch, is turned towards the flange: after the introduction considered, which causes a slight radial compression of the thickened portions, these latter relax radially rather like a detent, which provides the desired axial locking.

Such a solution presents the disadvantage that in the long run the lugs, opened out rather like the petals of a flower, risk opening out more and more and no longer providing the axial locking with the force desired, axial play then possibly appearing between the edge of the hole of the support and the flange and/or between said edge and the thickened portions. Moreover this solution makes it practically impossible to extract the clip without destroying it.

The invention has as its aim, especially, to remedy these disadvantages.

In the clips of the invention, the axial locking means are again formed by radially thickened portions of the side wall of the socket, bordered by two longitudinal slots passing through this wall from one side to the other, but these clips are characterized in that the thickened portions are connected with the inner edge of the flange by bridges.

In this way the radial expansion of the thickened portions due to the screwing of a screw into the socket results in nipping hard the edge of the hole of the support between these thickened portions and the flange, providing a firm fastening, durable and without play of the clip on the support.

In the preferred embodiments, recourse is had furthermore to one and/or the other of the following arrangements:

the two longitudinal slots which border each thickened portion are interconnected by a transverse slot spaced axially further from the flange than said thickened portion, this latter being thus surrounded by a U-shaped groove, the free ends of whose legs are located at the flange, in a clip according to the preceding paragraph, the base of the U is located substantially in the middle of the axial length of the socket, for an axial length of the socket of the order of 10 to 15 mm, the width of each slot is of the order of 1 mm and the width of the U itself is of the order of 3 to 5 mm, the thickened portions of the wall of the socket project radially from this wall, not only outwardly but also inwardly, for a fastening device of the above kind intended for cooperating with non circular holes each formed by a circular hole itself extended radially by two diametrically opposed rectangular notches, the wall of the socket is reinforced outwardly by two longitudinal ribs each having the general shape of a semi-pyramid whose base has a rectangular section complementary to that of a notch and is connected to a prismatic bottom having the same cross section adjacent the flange.

The invention comprises, apart from these principal features, other features which are preferably used at the same time and which will be more explicitly discussed hereafter.

In what follows there will be described two preferred embodiments of the invention referring to the accompanying drawings in a way which is of course in no wise limiting.

FIG. 1 of those drawings shows in perspective a view of a fastening clip constructed in accordance with the invention as well as a piece of drilled metal plate adapted to receive this clip.

FIGS. 2, 3 and 4 show the same clip in axial section, respectively in three successive steps of use, i.e. first of all when it is placed on the metal plate, then after being thus placed, waiting to receive a screw for fastening a part on to the metal plate, and finally after fastening said part by screwing the screw.

FIG. 5 shows a side view of a variation of the above clip also constructed in accordance with the invention.

FIG. 6 shows the clip of FIG. 5 in an axial section similar to that of FIG. 4, i.e. corresponding to a finished fastening.

Generally the clip is in the form of a one-piece moulded part made from a plastic material or similar sufficiently flexible for a screw to plough therein its own furrow and, at the same time, sufficiently hard to then retain this screw, a material which may be particularly a polyamide (nylon), polytetrafluoroethylene, polymonochlorotrifluoroethylene or certain elastomers.

This part has the general shape of a socket 1 whose wall 2, relatively thick (e.g. of a thickness of the order of 2 to 6 mm), is defined outwardly by a cylindrical or prismatic surface 3 and inwardly by a surface 4 cylindrical in shape or slightly in the shape of a truncated cone.

Said socket is extended on the outside at one of its axial ends—the one corresponding to the large base of the truncated cone in the case of a surface 4 in the shape of a truncated cone—by a transverse annular flange 5 itself bordered by rim 6 projecting from the face, of said flange, turned towards said socket.

In addition there is provided in wall 2 a thickened portion 7 forming a stop catch, as will be explained hereafter, and limited for this purpose by a transverse annular ledge 8 turned facing flange 5, said ledge being disposed at an axial distance from rim 6 substantially equal to the thickness of the metal plates 9 with which the clip under consideration is intended to cooperate.

The number of annular ledges turned towards the flange, of the type defined by ledge 8, may be greater than one to take into account different thicknesses of metal plates 9 to be equipped, but no ledge is to be found turned in the opposite direction, ledge 8 the furthest from the flange being connected by a continuous sloping ramp with the rest of the external surface 3 of the socket.

The number of catches 7 is preferably equal to two, these catches being then diametrically opposed.

Each catch 7 is surrounded by a groove 10 passing through the wall 2 from one side to the other, and extending in an open U towards the flange.

In other words, groove 10 comprises two parallel longitudinal slots $10_1$ each having one end at the level of flange 5 and connected at their other ends by a transverse slot $10_2$.

This latter transverse slot $10_2$ is disposed substantially in the middle of the axial length of the socket.

Because of the particular shape adopted for groove 10, each catch 7 is connected by a bridge 11 to the inner edge of flange 5.

The outer contour of the socket in the immediate neighbourhood of the flange is complementary to that of each non circular hole 12, bored in metal plate 9, with which the clip is intended to co-act.

Said contour of each hole 12 may be circular, but to prevent the clips from rotating in their hole during and after screwing, it is preferred that this contour is not circular: it may for example be rectangular or square.

In the preferred embodiments, it is in the form of a circle $21_1$ having a diameter equal to that of the outer surface 3, then cylindrical in revolution, extended radially by two diametrically opposed rectangular cavities $12_2$.

In such a case, wall 2 of the socket is reinforced on the outside by two longitudinal ribs 13.

Each rib 13 has advantageously the general shape of a semi-pyramid converging towards the axial end of the socket the furthest away from the flange and having a rectangular base extended by a prismatic bottom 14 of the same cross section, said sections being complementary to that of a cavity $12_2$.

The mean axial plane of the two ribs 13 is perpendicular to that of the two catches 7.

The operation of the device described above is the following.

Let us suppose that on a metal plate 9 perforated with a hole 12 of the type indicated above it is desired to fasten a part which is represented in the drawing (FIGS. 3 and 4) as being a small plate 15 drilled with a circular hole 16.

We begin by introducing the clip into hole 12 turning it so that its ribs 13 penetrate into notches $12_2$: this introduction is facilitated by the pyramidal form of these ribs, whose tip is introduced first of all into the corresponding notch.

At the moment, during this introduction, when catches 7 are presented at the level of hole 12, they are pushed slightly back radially towards the axis of the clip, as can be seen in FIG. 2.

Then, after passing this position, the catches 7 relax elastically outwardly and they lock the clip in its fitted position on the plate by axially butting against the edge of hole 12 (see FIG. 3).

The axial position of the socket corresponding to this relaxation of the catches is practically that in which rim 6 of the flange contacts metal plate 9.

But this contact may come just before said relaxation, the axial progression of the central portion of the flange being able to continue a little beyond that of its periphery, with a slight distortion of said flange, which ensures a firm and tight application of rim 6 against metal plate 9.

Then the small plate 15 is placed on said metal plate so that hole 16 of this small plate is coaxial with flange 5.

Then a screw 17 is pushed into hole 16, then into socket 1 by screwing it the outer diameter of this screw being greater than the inner diameter of the socket.

The thread of this screw 17 progressively ploughs its furrow 18 in the inner face 4 of this socket.

This screwing results in a progressive spreading out of catches 7 for successively two reasons:

the first reason resides in the fact that the diameter of the thread of screw 17 is greater than that of the adjacent face of catches 7, this spreading out effect being accentuated if there are provided extra thicknesses of material on the inner faces of said catches 7, the second reason, which is the most important, comes from the fact that, during the screwing considered, the continuous ring 19 which forms the tip of the socket the furthest away from flange 5 tends to draw axially nearer this flange, which in a first stage, makes this ring come axially into contact with the feet opposite catches 7 by cancelling slots $10_2$ then, in a second stage, pushes these feet axially back while accentuating the distortion begun for the first reason given above.

The spreading out of the catches 7 thus obtained takes place by the bending of these latter around their bridges 11 forming hinges (FIG. 4), which provides an extremely efficient and durable nipping of metal plate 9 between these catches and flange 5, and so a very firm fastening, on metal plate 9, of the clip which forms in short the screw of the fixture.

In the variation of FIGS. 5 and 6, we find again practically all the elements of the embodiment which has just been described with reference to FIGS. 1 to 4: in these FIGS. 5 and 6 the same references as before have been kept for said elements.

This variation differs from the preceding one by the absence of any transverse slot $10_2$: in other words, catches 7 are only bordered by two parallel longitudinal slots $10_1$ and are connected not only to flange 5 by first bridges 11 of the type previously described, but also to ring 19 by second bridges 20.

The distortion of these catches during screwing of a screw 17 into socket 1 corresponds then rather to a local radial swelling of these catches, located between bridges 11 and 20 (see FIG. 6), than to an opening out in the form of the mouth of a trumpet or pagoda such as that obtained by bending about the single bridges 11 as in the preceding embodiment.

Following which, and whatever the embodiment adopted, there are finally provided fastening clips whose construction and use follow sufficiently from what has gone before.

These clips offer numerous advantages over those existing up to date, particularly in so far as the firmness and the duration of the fastenings which they provide are concerned, as well as the possibility of extracting them laterally from their support without destroying them, after unscrewing the corresponding screws: this latter advantage is important in practice for, since the coachwork elements of vehicles equipped with the clips considered are closed boxes, when extracting a clip it must at all costs be avoided that a piece of this clip remains imprisoned in such a box, for it would risk becoming a source of very unpleasant noises.

As is evident, and as it follows already from what has gone before, the invention is in no wise limited to those of its embodiments and modes of application which have been more especially considered: it embraces, on the contrary, all variations thereof, particularly:

those in which the thickened portions of the side wall of the socket are in the form of bosses other than stop catches properly speaking, bosses for example defined by dihedrons formed from two sloping continuous ramps tilted in two opposite directions on the axis of the socket, those in which the flange is formed by other perforated elements than a disc of revolution, such as element being possibly an asymmetrical disc both of whose faces extend respectively in two non parallel planes, or else a cylindrical shank forming a bracing piece between the metal plate on which it is desired to fasten an object and this object itself.

We claim:

1. A device for fastening by screwing an object on a support perforated with a hole, formed by a screw and a one-piece clip made from a moulded material comprising a socket with a relatively thick wall adapted to penetrate jointingly into the hole of the support and to receive the screw so that it ploughs its furrow therein itself, said socket forming at one of its ends a continuous ring and being extended radially at its other end by a continuous transverse flange adapted to bear on the edge of said hole, the wall of the socket comprising in addition radially thickened portions each bordered by two longitudinal slots which pass through said wall from side to side, characterised in that these thickened portions are connected to the inner edge of the flange by bridges and the longitudinal slots being inter-connected by a transverse slot spaced axially further from the flange than said thickened portion, this latter being thus surrounded by a U-shaped slot formed by the longitudinal and transverse slots, the free ends of the U being situated at the level of the flange.

2. A fastening device according to claim 1, characterised in that the base transverse slots are situated substantially in the middle of the axial length of the socket.

3. A fastening device according to claim 1, characterised in that, for an axial length of the socket of the order of 10 to 15 mm, the width of each slot is of the order of 1 mm and the width of the U itself is of the order of 3 to 5 mm.

4. A fastening device according to claim 1, characterised in that the thickened portions of the wall of the socket project radially from this wall, not only outwardly, but also inwardly.

5. A fastening device according to claim 1, for cooperating with non circular holes each formed by a circular hole itself extended radially by two diametrically opposed rectangular notches, characterised in that the wall of the socket is strengthened on the outside by two longitudinal ribs each having the general shape of a semi-pyramid whose base has a rectangular section complementary to that of a notch and is connected to a prismatic bottom having the same cross section adjacent the flange.

6. A one-piece fastening device made of molded material for use in fastening one element to another with the aid of a screw, said device comprising a socket body having a bore and adapted to be inserted into a hole in one of the elements and to receive in the screw of larger diameter than the bore so that rotation of the screw plows a furrow in the material of the body, the socket body having at one end a continuous radially extending flange and forming at its other end a continuous ring, the wall of the socket body intermediate the flange and the ring having circumferentially spaced-apart radially thickened portions protruding radially beyond the remainder of the body, each thickened portion being bordered by two longitudinal slots which pass through the wall of the socket body from inside to outside, each thickened portion being connected to the flange by a bridge of lesser radial thickness than the thickened portion, the junction between each thickened portion and its respective bridge forming a ledge having a surface facing the flange, said surface being adapted, during use of the device, to engage a surface of the element into which the device is inserted, and each thickened portion having a free end, remote from its respective bridge, formed by a transverse slot which joins the two respective longitudinal slots and which passes through the wall of the body from inside to outside.

7. A one-piece fastening device made of molded material for use in fastening one element to another with the aid of a screw, said device comprising a socket body having a bore and adapted to be inserted into a hole in one of the elements and to receive in the screw of larger diameter than the bore so that rotation of the screw plows a furrow in the material of the body, the socket body having at one end a continuous radially extending flange and forming at its other end a continuous ring, the wall of the socket body intermediate the flange and the ring having circumferentially spaced apart radially thickened portions each of which is bordered by two longitudinal slots and a transverse slot so as to form a free end adjacent the ring, each thickened portion being connected to the flange.

8. A device for fastening by screwing an object on a support perforated with a non-circular hole formed by a circular hole itself extended radially by two diametrically opposed rectangular notches, said device comprising a one-piece clip made from a moulded material and having a socket with a relatively thick wall adapted to penetrate jointingly into the hole of the support and to receive a screw so that it ploughs its furrow therein itself, said socket forming at one of its ends a continuous ring and being extended radially at its other end by a continuous transverse flange adapted to bear on the edge of said hole, the wall of the socket comprising in addition radially thickened portions each bordered by two longitudinal slots which pass through said wall from side to side, characterised in that these thickened portions are connected to the inner edge of the flange by bridges, the wall of the socket being strengthened on the outside by two longitudinal ribs each having the general shape of a semi-pyramid whose base has a rectangular section complementary to that of one of the notches of the non-circular hole and is connected to a prismatic bottom having the same cross section adjacent the flange.

* * * * *